United States Patent
Watanabe et al.

(10) Patent No.: US 12,293,876 B2
(45) Date of Patent: May 6, 2025

(54) POWER SUPPLY DEVICE AND CAPACITOR

(71) Applicant: Mitsubishi Electric Corporation, Tokyo (JP)

(72) Inventors: Tomoki Watanabe, Tokyo (JP); Mitsuhiro Takada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 874 days.

(21) Appl. No.: 17/428,148

(22) PCT Filed: Feb. 8, 2019

(86) PCT No.: PCT/JP2019/004614
§ 371 (c)(1),
(2) Date: Aug. 3, 2021

(87) PCT Pub. No.: WO2020/161883
PCT Pub. Date: Aug. 13, 2020

(65) Prior Publication Data
US 2022/0028616 A1    Jan. 27, 2022

(51) Int. Cl.
*H01G 4/228* (2006.01)
*H01G 2/02* (2006.01)
(Continued)

(52) U.S. Cl.
CPC .............. *H01G 4/228* (2013.01); *H01G 2/02* (2013.01); *H02M 1/12* (2013.01); *H02M 7/003* (2013.01); *H02M 7/2173* (2013.01)

(58) Field of Classification Search
CPC ............ H01G 4/228; H01G 2/02; H01G 4/33; H02M 1/12; H02M 7/003; H02M 7/2173
(Continued)

(56) References Cited

U.S. PATENT DOCUMENTS 5,132,896 A * 7/1992 Nishizawa ......... H05K 7/14329
                                                        363/141
9,584,061 B1 * 2/2017 Dede ....................... H02P 29/60
(Continued)

FOREIGN PATENT DOCUMENTS

JP    2017055557 A    3/2017
JP    2017112789 A    6/2017
(Continued)

OTHER PUBLICATIONS

Office Action dated Apr. 26, 2022, issued in corresponding Indian patent Application No. 202127034452, 6 pages.
(Continued)

*Primary Examiner* — Arun Ramaswamy
(74) *Attorney, Agent, or Firm* — Buchanan Ingersoll & Rooney PC (57) ABSTRACT

A power supply device converts power supplied from a power source to power to be supplied to a load and supplies the converted power to the load from an output terminal. The power supply device includes a capacitor that includes a case, a first terminal exposed outside the case, and a second terminal exposed outside the case. The first terminal is fixed to a busbar. The busbar electrically connects the first terminal to the output terminal of the power supply device. The second terminal is fixed to an electrically conductive support that receives a reference potential.

20 Claims, 10 Drawing Sheets

(51) Int. Cl.
     *H02M 1/12*        (2006.01)
     *H02M 7/00*        (2006.01)
     *H02M 7/217*      (2006.01)

(58) Field of Classification Search
     USPC .......................... 361/271, 511, 301.5, 306.3
     See application file for complete search history.

(56) References Cited

U.S. PATENT DOCUMENTS

| | | | |
|---|---|---|---|
| 2005/0195557 A1* | 9/2005 | Hayashi | H01G 11/52 |
| | | | 361/504 |
| 2015/0229206 A1* | 8/2015 | Kaji | H02M 7/003 |
| | | | 307/43 |
| 2018/0358903 A1 | 12/2018 | Takahashi et al. | |
| 2019/0008001 A1 | 1/2019 | Kanai et al. | |
| 2019/0008002 A1 | 1/2019 | Kanai et al. | |

FOREIGN PATENT DOCUMENTS

| | | | |
|---|---|---|---|
| JP | 2017118693 A | 6/2017 | |
| JP | 2018207718 A | 12/2018 | |

OTHER PUBLICATIONS

International Search Report (PCT/ISA/210) with translation and Written Opinion (PCT/ISA/237) mailed on Apr. 9, 2019, by the Japan Patent Office as the International Searching Authority for International Application No. PCT/JP2019/004614.

* cited by examiner

POWER SUPPLY DEVICE AND CAPACITOR

TECHNICAL FIELD

The present disclosure relates to a power supply device and a capacitor for reducing electromagnetic noise.

BACKGROUND ART

Electric vehicles such as electric railway vehicles and electric cars may include a power supply device that converts power supplied from a power source to intended alternating current (AC) power, and supplies the resulting power to a load in the vehicle. An example of such a power supply device is described in Patent Literature 1. This power supply device includes multiple power modules each including two switching elements connected in series, and two diodes connected to the respective switching elements in parallel. When the switching element is switched between on and off, the power supply device converts power supplied from a battery to AC to be supplied to a motor, and supplies the resulting power to the motor. To reduce noise caused when the switching element is switched between on and off, the power supply device also includes multiple capacitors connected to secondary terminals of the corresponding power modules.

CITATION LIST

Patent Literature

Patent Literature 1: Unexamined Japanese Patent Application Publication No. 2017-112789

SUMMARY OF INVENTION

Technical Problem

Each capacitor includes a capacitor element including a dielectric and two electrodes opposing each other with the dielectric in between, a case that accommodates the capacitor element, and multiple lead wires each having one end connected to a corresponding one of the electrodes and drawn out of the case. The lead wire connected to one of the electrodes of the capacitor is connected to the power module through a busbar and an electric wire. Specifically, the electric wire has one end connected to the busbar connected to the secondary terminal of the power module, and the other end connected to the lead wire connected to one of the electrodes of the capacitor. The lead wire connected to the other one of the electrodes of the capacitor is connected to a frame receiving a reference potential through the electric wire.

As described above, the capacitor has one of the electrodes electrically connected to the secondary terminal of the power module through the lead wire, the electric wire, and the busbar, and the other one of the electrodes electrically connected to the frame through the lead wire and the electric wire. In this structure, an increase in length of the electric wire and the lead wire increases parasitic inductance and parasitic impedance. The capacitor may thus fail to sufficiently filter noise, which may result in failing to provide an intended output wave form.

In response to the above issue, an objective of the present disclosure is to provide a power supply device with high noise-filtering performance.

Solution to Problem

To achieve the above objective, a power supply device according to an aspect of the present disclosure is a power supply device for converting power supplied from a power source to power to be supplied to a load and supplying the converted power to the load from an output terminal. The power supply device includes a power converter, a capacitor, a busbar, and an electrically conductive support. The power converter converts the power supplied from the power source to the power to be supplied to the load and outputs the converted power to the output terminal. The capacitor includes a dielectric, two electrodes opposing each other with the dielectric in between, a case, a first terminal, and a second terminal. The capacitor is located in a circuit between the power converter and the output terminal. The case accommodates the dielectric and the two electrodes. The first terminal is electrically connected to one of the two electrodes and exposed outside the case. The second terminal is electrically connected to the other one of the two electrodes and exposed outside the case. The first terminal is fixed to the busbar. The busbar electrically connects the first terminal to the output terminal. The second terminal is fixed to the electrically conductive support. The electrically conductive support receives a reference potential.

Advantageous Effects of Invention

The first terminal of the capacitor included in the power supply device according to the present disclosure is fixed to the busbar, and electrically connected to the output terminal of the power supply device with the busbar. The second terminal of the capacitor is fixed to the electrically conductive support that receives a reference potential. This structure thus does not necessarily include lead wires and electric wires drawn out of a case to electrically connect the first terminal and the busbar. This structure does not necessarily include lead wires and electric wires drawn out of a case to electrically connect the second terminal and the support. This structure reduces parasitic inductance and parasitic impedance resulting from the lead wires and the electric wires, which results in that the power supply device can have high noise-filtering performance.

DESCRIPTION OF EMBODIMENTS

A capacitor and a power supply device according to one or more embodiments of the present disclosure is described in detail with reference to the drawings. In the drawings, the same or equivalent components are given the same reference numerals.

Embodiment 1

Figure 1:
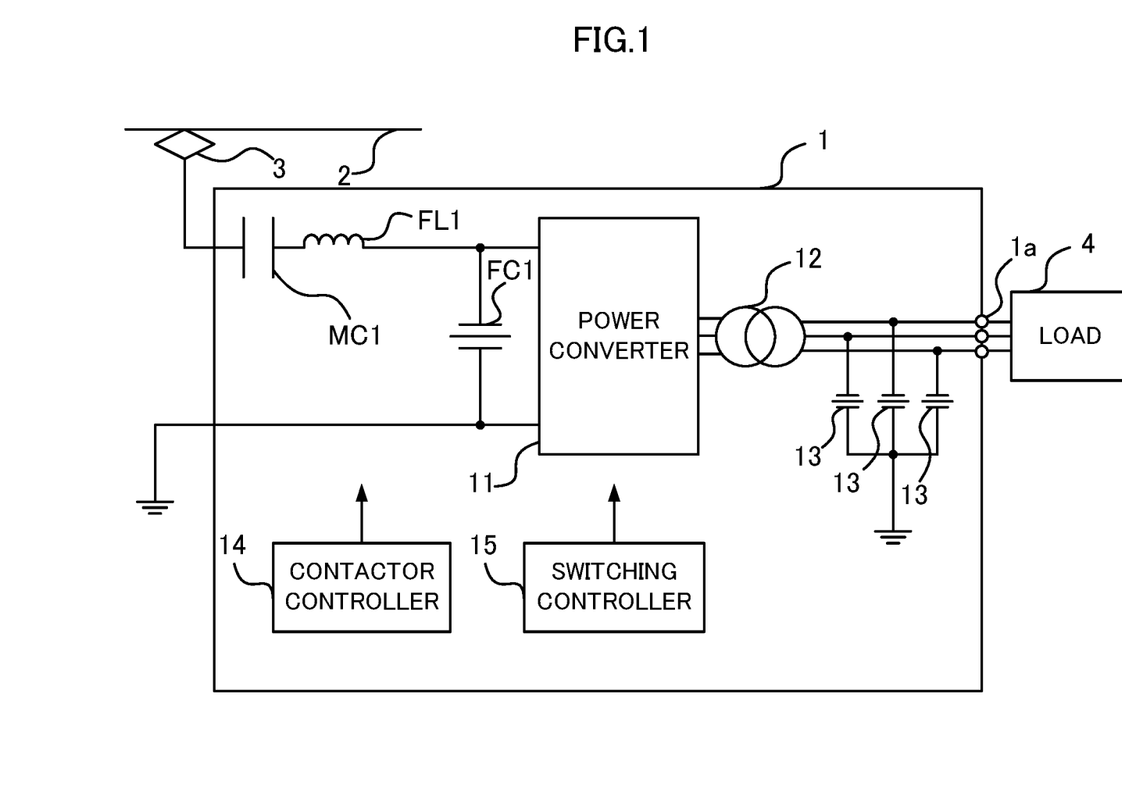
FIG. 1 is a block diagram of a power supply device according to Embodiment 1 of the present disclosure.

In Embodiment 1, a power supply device installed in an electric railway vehicle using a direct-current (DC) feeder is described. As illustrated in FIG. 1, a current collector 3 installed in the electric railway vehicle acquires DC power from a substation, serving as a DC power source, through an overhead line 2, and supplies the power to a power supply device 1 according to Embodiment 1. To supply power to a load 4 installed in the electric railway vehicle, the power supply device 1 converts the DC power supplied from the current collector 3 to three-phase alternating-current (AC) power. The power supply device 1 then supplies the three-phase AC power to the load 4 from output terminals 1a. Each output terminal 1a is electrically connected to the corresponding input terminal of the load 4.

The power supply device 1 includes a contactor MCI having one end connected to the current collector 3, a filter reactor FL1 having one end connected to the other end of the contactor MC1, a filter capacitor FC1 having one end connected to the other end of the filter reactor FL1 and the other end grounded, a power converter 11 having primary terminals between which the filter capacitor FC1 is connected, and a transformer 12 having primary terminals connected to the corresponding secondary terminals of the power converter 11. The power supply device 1 also includes capacitors 13 in a circuit between the power converter 11 and the output terminals 1a to reduce noise contained in outputs from the power converter 11. More specifically, the power supply device 1 includes multiple capacitors 13 each having one end connected to the corresponding secondary terminal of the transformer 12, and having the other end grounded. In Embodiment 1, the power supply device 1 includes three capacitors 13. The power supply device 1 also includes a contactor controller 14 for controlling the contactor MC1, and a switching controller 15 for controlling a switching element included in the power converter 11.

The contactor MC1 includes a DC electromagnetic contactor. The contactor MC1 is controlled by the contactor controller 14. When the contactor controller 14 turns on the contactor MC1, the one end and the other end of the contactor MC1 are connected to each other. The current collector 3 and the filter reactor FL1 are thus electrically connected to each other. Consequently, the power converter 11 is electrically connected to the current collector 3. When the contactor controller 14 opens the contactor MC1, the one end and the other end of the contactor MC1 are insulated from each other. The filter reactor FL1 is thus electrically disconnected from the current collector 3. Consequently, the power converter 11 is electrically disconnected from the current collector 3.

The filter reactor FL1 reduces harmonic components contained in the current input from the current collector 3.

The filter capacitor FC1 is charged with DC power supplied from the current collector 3. The filter capacitor FC1 smooths the voltage.

The filter reactor FL1 and the filter capacitor FC1 form an LC filter to reduce noise components contained in the current input from the overhead line 2.

The power converter 11 converts the DC power supplied from the current collector 3 through the primary terminals to three-phase AC power. The power converter 11 then supplies the three-phase AC power to the load 4 through the transformer 12 connected to the secondary terminals of the power converter 11 and through the capacitors 13. More specifically, when the switching element included in the power converter 11 is controlled by the switching controller 15, the power converter 11 converts the DC power to three-phase AC power, and supplies the three-phase AC power to the load 4.

The power converter 11 includes, for example, a constant voltage constant frequency (CVCF) inverter.

The primary terminals of the transformer 12 are connected to the respective secondary terminals of the power converter 11. The secondary terminals of the transformer 12 are connected to the load 4 through the output terminals 1a. The transformer 12 decreases the voltage of the three-phase AC power input through the primary terminals, and supplies the three-phase AC power with the decreased voltage to the load 4 from the secondary terminals. The transformer 12 decreases the voltage of the input three-phase AC power to a voltage appropriate for driving the load 4.

Each capacitor 13 is connected to the corresponding one of the secondary terminals of the transformer 12, and reduces noise contained in the output from the power converter 11.

The contactor controller 14 acquires a voltage value between the one end of the contactor MC1 and the other end of the filter capacitor FC1 from a voltage measuring device (not illustrated) that measures voltage values. When acquiring a voltage value higher than or equal to a threshold voltage from the voltage measuring device, the contactor controller 14 turns on the contactor MC1. The threshold voltage is set to, for example, the lower limit of the possible range of the voltage values of the overhead line 2.

After the contactor MC1 is turned on, the switching controller 15 controls the switching element to maintain the three-phase AC power output by the power converter 11 at a constant voltage and a constant frequency.

Figure 2:
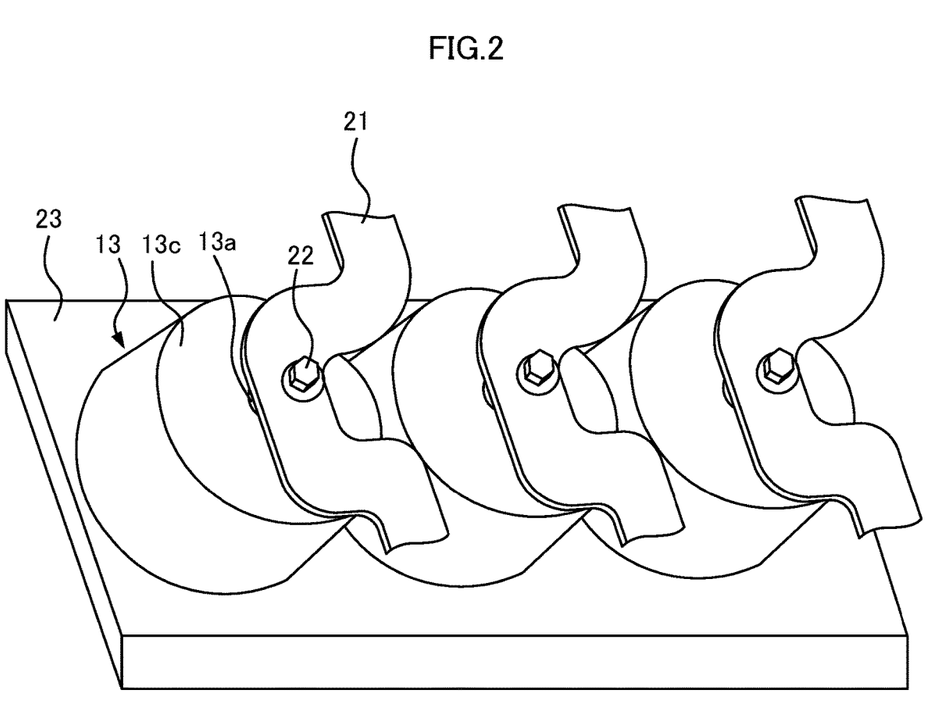
FIG. 2 is a perspective view of a capacitor according to Embodiment 1.

The above power supply device 1 includes the three capacitors 13 to reduce noise contained in the outputs from the power converter 11. One end of each capacitor 13 is connected to the corresponding secondary terminal of the transformer 12, and the other end of each capacitor 13 receives a reference potential. More specifically, as illustrated in FIG. 2, one end of each capacitor 13 is connected to a busbar 21. The busbar 21 is located in a circuit between the secondary terminals of the transformer 12 and the output terminals 1a. The secondary terminals of the transformer 12 are electrically connected to the load 4 through the busbars 21 and the output terminals 1a. The other end of each capacitor 13 is connected to a support 23 that receives a reference potential. The capacitors 13 have the same structure and operate similarly. Thus, the structure of one of the capacitors 13 is described in detail.

Figure 3:
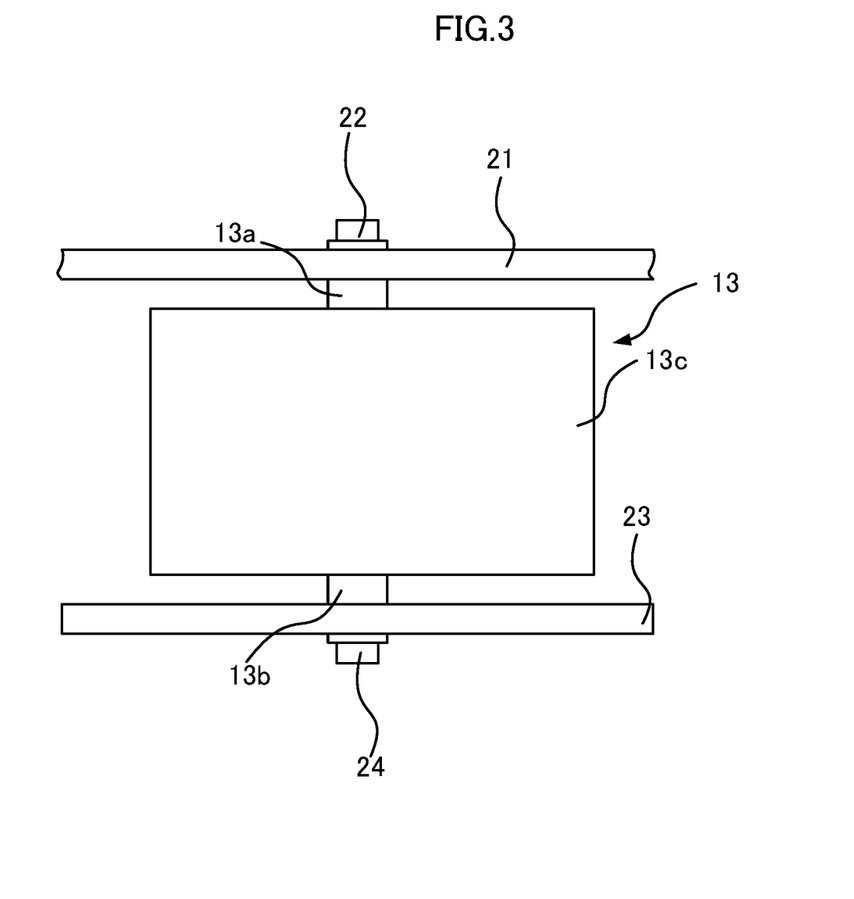
FIG. 3 is a front view of the capacitor according to Embodiment 1.
Figure 4:
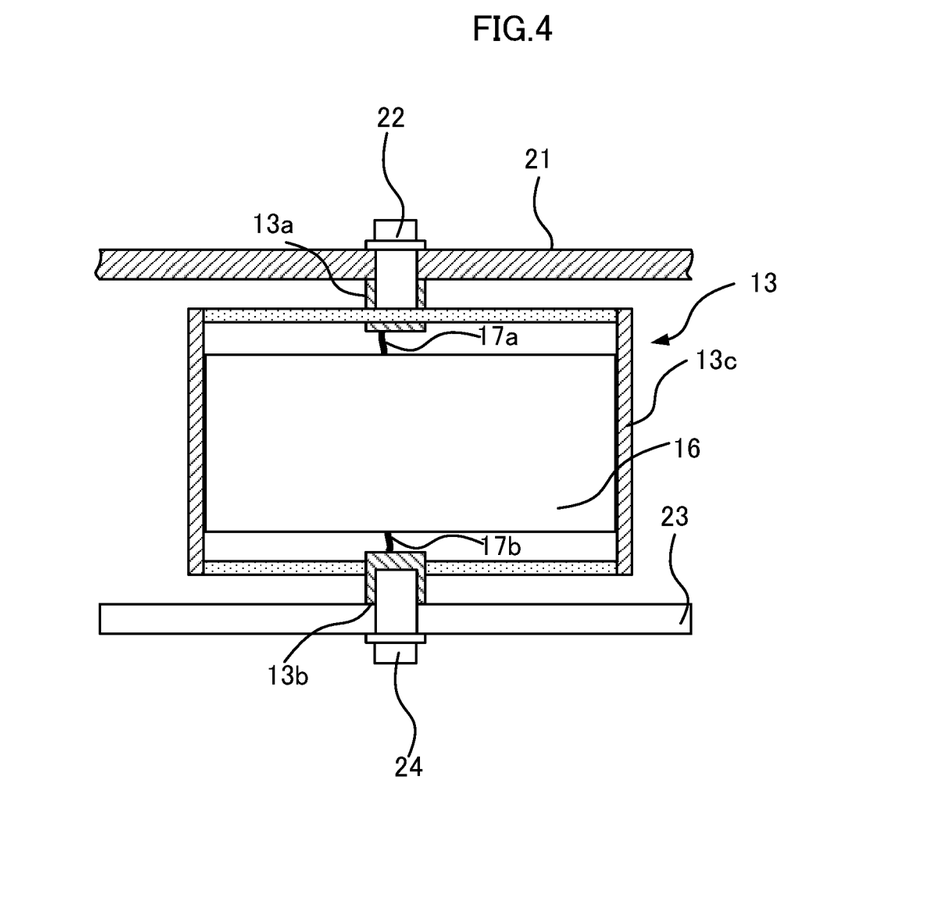
FIG. 4 is a cross-sectional view of the capacitor according to Embodiment 1.

As illustrated in FIGS. 2 to 4, the capacitor 13 includes a case 13c accommodating a capacitor element 16 (described later), a first terminal 13a exposed through the case 13c, a second terminal 13b exposed through the case 13c, the capacitor element 16, a lead tab 17a that electrically connects the capacitor element 16 to the first terminal 13a, and a lead tab 17b that electrically connects the capacitor element 16 to the second terminal 13b.

The case 13c has a shape of a cylinder having two closed end surfaces. The case 13c is insulated from the first and second terminals 13a and 13b. More specifically, the case 13c includes a hollow cylindrical member formed of aluminum, and insulators that close two ends of the hollow cylindrical member. The two end surfaces of the case 13c have through-holes to allow the first and second terminals 13a and 13b to extend through.

The first terminal 13a is exposed outside through the through-hole in one of the end surfaces of the case 13c. The first terminal 13a, in contact with the busbar 21, is fixed to the busbar 21. More specifically, the first terminal 13a, in contact with the busbar 21, is fixed to the busbar 21 with a fastener 22. The fastener 22 is formed of a conductor, for example, metal such as copper or aluminum. The first terminal 13a, in contact with the busbar 21 and fixed to the busbar 21, is electrically connected to the busbar 21. The fastener 22 formed of a conductor helps conduction of electricity between the first terminal 13a and the busbar 21. This structure increases the efficiency of electrical conduction between the first terminal 13a and the busbar 21.

In some embodiments, the first terminal 13a may have an insertion hole in which the fastener 22 is fitted. In this case, the fastener 22 may preferably have a screw shape, and the insertion hole in the first terminal 13a may preferably have a groove in which the fastener 22 is fitted. The first terminal 13a, in contact with the busbar 21, is fixed to the busbar 21 with the fastener 22 received in the insertion hole in the first terminal 13a. The first terminal 13a including a screw terminal is fixed to the busbar 21 to resist vibrations from the electric railway vehicle. This reduces the likelihood that the first terminal 13a is detached from the busbar 21 under vibrations from the electric railway vehicle.

In some embodiments, the busbar 21 may be shaped to have the first terminal 13a fitted with the busbar 21. For example, the busbar 21 may have a recess in which the first terminal 13a is fitted. In this case, the fastener 22 fixes the first terminal 13a to the busbar 21 with the first terminal 13a fitted in the recess in the busbar 21. Thus, the first terminal 13a is fixed to the busbar 21 to resist vibrations from the electric railway vehicle. This reduces the likelihood that the first terminal 13a is detached from the busbar 21 under vibrations from the electric railway vehicle.

The second terminal 13b is exposed outside through the through-hole in the other one of the end surfaces of the case 13c. The second terminal 13b receives a reference potential. More specifically, the second terminal 13b, in contact with the support 23 receiving a reference potential, is fixed to the support 23 with a fastener 24. The support 23 and the fastener 24 are formed of a conductor, such as copper or aluminum. The second terminal 13b, in contact with the support 23, is fixed to the support 23 and receives a reference potential. In the example of Embodiment 1, the support 23 is grounded, and the second terminal 13b is grounded. The fastener 24 formed of a conductor helps conduction of electricity between the second terminal 13b and the support 23. This structure increases the efficiency of electrical conduction between the second terminal 13b and the support 23.

In some embodiments, the second terminal 13b may include a screw terminal. In this case, the second terminal 13b, in contact with the support 23, is fixed to the support 23 with the fastener 24 received in the threaded hole in the second terminal 13b. The second terminal 13b including a screw terminal is fixed to the support 23 to resist vibrations from the electric railway vehicle. This reduces the likelihood that the second terminal 13b is detached from the support 23 under vibrations from the electric railway vehicle.

In some embodiments, the support 23 may have a recess in which the second terminal 13b is fitted. In this case, the fastener 24 fixes the second terminal 13b to the support 23 with the second terminal 13b fitted in the recess in the support 23.

Thus, the second terminal 13b is fixed to the support 23 to resist vibrations from the electric railway vehicle. This reduces the likelihood that the second terminal 13b is detached from the support 23 under vibrations from the electric railway vehicle.

Figure 5:
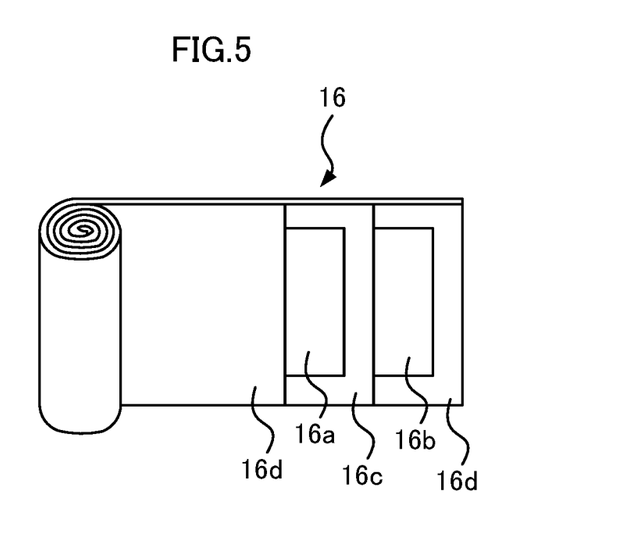
FIG. 5 is a drawing of a capacitor element according to Embodiment 1.

As illustrated in FIG. 5, the capacitor element 16 includes an electrode 16a, an electrode 16b, a separator 16c held between the electrodes 16a and 16b, and separators 16d that hold the electrodes 16a and 16b in between. An oxide film formed on the surface of the electrode 16a that is in contact with the separator 16c functions as a dielectric.

The lead tab 17a electrically connects the electrode 16a to the first terminal 13a.

The lead tab 17b electrically connects the electrode 16b to the second terminal 13b.

In the power supply device 1 according to the embodiment of the present disclosure, as described above, the first terminal 13a of the capacitor 13 in contact with the busbar 21 is fixed to the busbar 21, and the second terminal 13b of the capacitor 13 in contact with the support 23 is fixed to the support 23. In other words, the power supply device 1 does not necessarily use lead wires or electric wires to place the capacitor 13 into contact with the busbar 21 and the support 23. Compared with a known capacitor including electrodes each connected to a busbar and a frame through a lead wire and an electric wire, this structure reduces parasitic inductance and parasitic impedance resulting from the lead wires or electric wires, and thus improves the noise filtering performance of the capacitor 13.

When an electric wire is used to connect the capacitor to the busbar, parasitic inductance and parasitic impedance vary depending on the manner of cutting the electric wire. Depending on the manner of cutting the electric wire, the parasitic inductance and the parasitic impedance may increase, and the noise filtering performance of the capacitor may be insufficient. In contrast, the power supply device 1 according to Embodiment 1 does not use an electric wire to connect the capacitor 13 to the busbar 21, and thus reduces fluctuations in parasitic inductance and parasitic impedance. The power converter 11 can thus provide an intended output voltage.

In addition, the first terminal 13a adjacent to the output terminal 1a, or in other words, the shorter length of the busbar 21 from each first terminal 13a to the corresponding output terminal 1a can reduce the parasitic inductance and the parasitic impedance resulting from the busbar 21. In some embodiments, the busbar 21 may preferably have a length of, for example, less than or equal to 300 millimeters from each first terminal 13a to the corresponding output terminal 1a.

Embodiment 2

Different capacitors 13 are provided to filter noise output from different power converters 11. The capacitors 13 appropriate for filtering noise from different power converters 11 can have different capacitances. The capacitors 13 with different capacitances have different dimensions. In the example in Embodiment 1, for the capacitors 13 with different dimensions, the power supply device 1 is to include the busbar 21 or the support 23 having a different shape. This complicates the assembly of the power supply device 1 to install the capacitor 13 with appropriate capacitance in accordance with the measurement results of output voltages from the power converter 11. In Embodiment 2, a power supply device 1 including a support 25 is described. The position of the support 25 in contact with the second terminal 13b of the capacitor 13 is adjustable.

Figure 6:
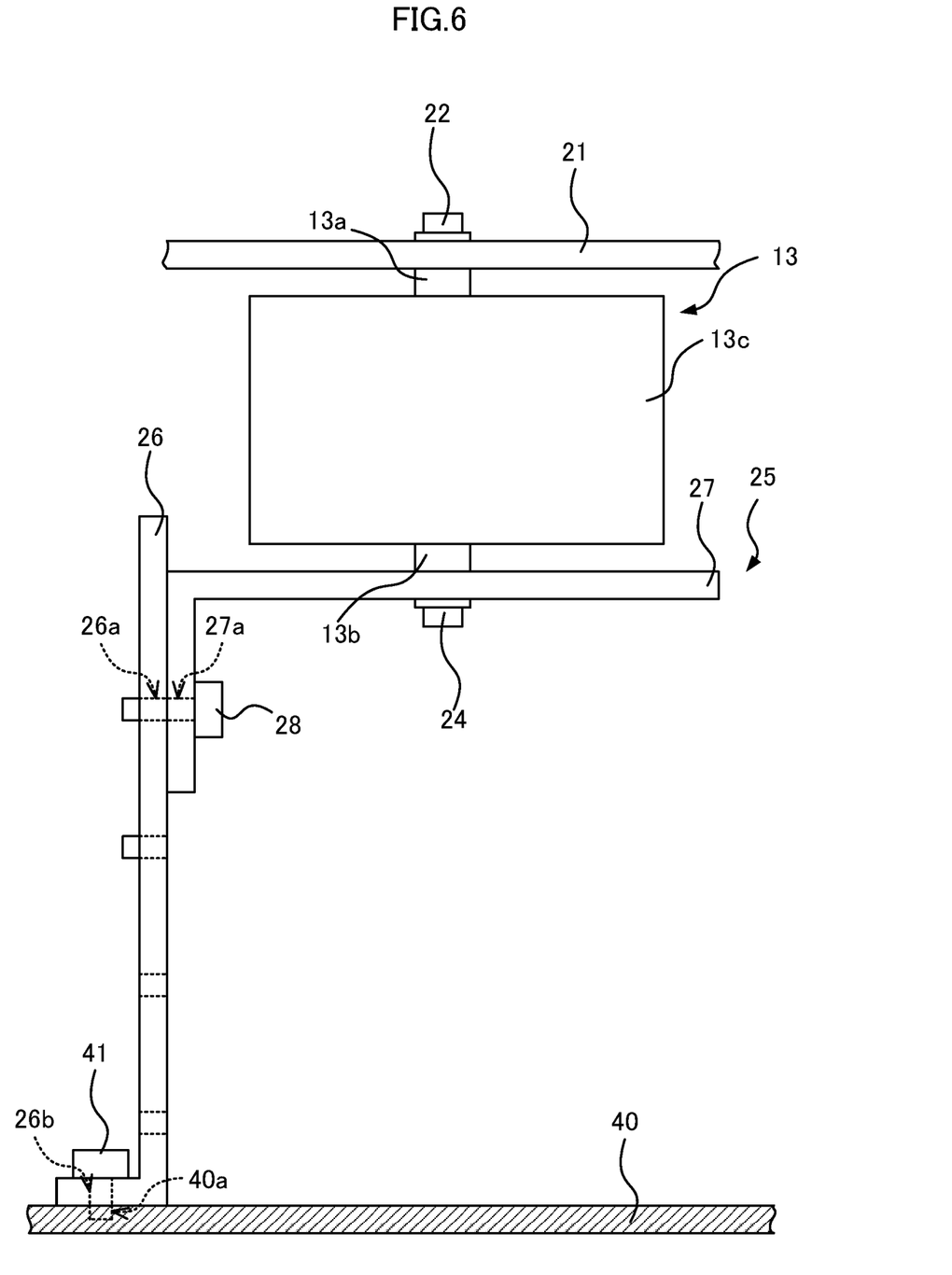
FIG. 6 is a front view of a capacitor and a frame earth according to Embodiment 2 of the present disclosure.

As illustrated in FIG. 6, the capacitor 13 included in the power supply device 1 according to Embodiment 2 is fixed to the support 25 instead of the support 23. The power supply device 1 includes a housing 40 that accommodates the capacitor 13. The housing 40 receives a reference potential. The power supply device 1 according to Embodiment 2 is described using the housing 40 grounded as an example.

The support 25 includes an electrically conductive fixing member 26 fixed to the grounded housing 40, and an electrically conductive movable member 27 that is movable relative to the fixing member 26 and in contact with the fixing member 26. The fixing member 26 and the movable member 27 are formed of a conductor, for example, metal such as copper or aluminum.

The power supply device 1 includes a fastener 28 that fixes the movable member 27 to the fixing member 26, and a fastener 41 that fixes the fixing member 26 to the housing 40. The fasteners 28 and 41 are formed of a conductor, for example, metal such as copper or aluminum. The fastener 28 formed of a conductor helps conduction of electricity between the movable member 27 and the fixing member 26. This structure increases the efficiency of electrical conduction between the movable member 27 and the fixing member 26. The fastener 41 formed of the conductor helps conduction of electricity between the fixing member 26 and the housing 40. This structure increases the efficiency of electrical conduction between the fixing member 26 and the housing 40.

The fixing member 26 has a surface facing the movable member 27 and a surface facing the housing 40. The surface of the fixing member 26 facing the movable member 27 has multiple through-holes 26a. The surface of the fixing member 26 facing the housing 40 has a through-hole 26b.

The movable member 27 has a surface facing the second terminal 13b of the capacitor 13 and a surface facing the fixing member 26. The surface of the movable member 27 facing the fixing member 26 has a through-hole 27a.

The surface of the housing 40 facing the fixing member 26 has an insertion hole 40a.

The fastener 28 extends through the through-hole 26a and 27a to fix the movable member 27 to the fixing member 26.

The fastener 41 extends through the through-hole 26b, and is received in the insertion hole 40a to fix the fixing member 26 to the housing 40.

Figure 7:
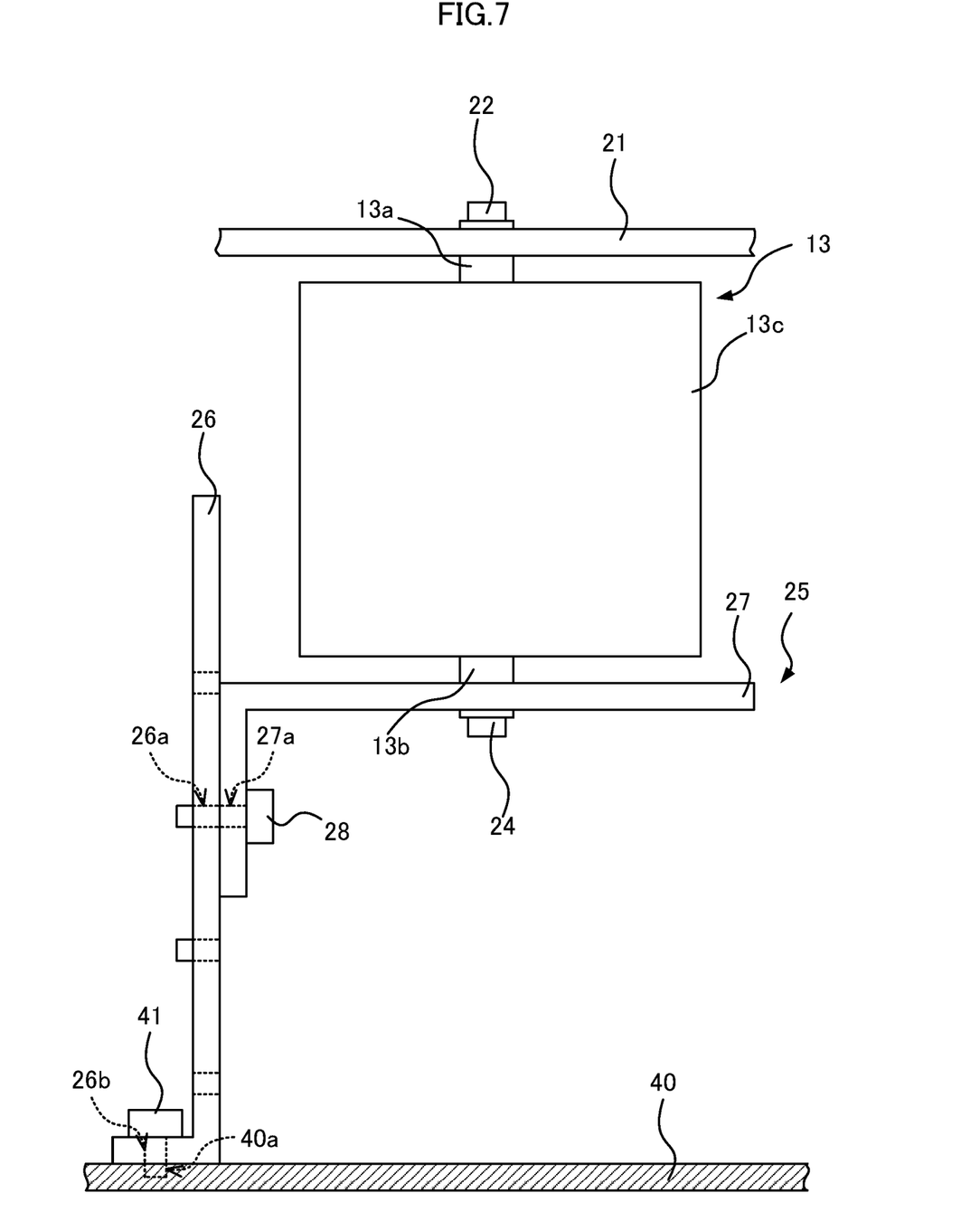
FIG. 7 is a front view of the capacitor and the frame earth according to Embodiment 2.

As illustrated in FIG. 7, in accordance with the dimensions of the capacitor 13, the movable member 27 may be moved relative to the fixing member 26, and the fastener 28 may be inserted into the through-hole 27a and a through-hole 26a different from the through-hole 26a in FIG. 6 to fix the movable member 27 to the fixing member 26.

As described above, the power supply device 1 according to Embodiment 2 can adjust the position of the support 25 to be in contact with the second terminal 13b in accordance with the dimensions of the capacitor 13. Thus, the shape of the busbar 21 and the support 25 is not necessarily changed in accordance with the dimensions of the capacitor 13. This simplifies the assembly of the power supply device 1.

Embodiment 3

A withstanding voltage test may be conducted to determine whether the power converter 11 has dielectric strength sufficient for the working voltage. When a withstanding voltage test is conducted with the second terminal 13b of the capacitor 13 grounded, the capacitor 13 receives a high voltage and may be broken. To avoid this, a power supply device 1 according to Embodiment 3 includes a mechanism for disconnecting the second terminal 13b of the capacitor 13 from the support that receives a reference potential. The power supply device 1 according to Embodiment 3 is described.

Figure 8:
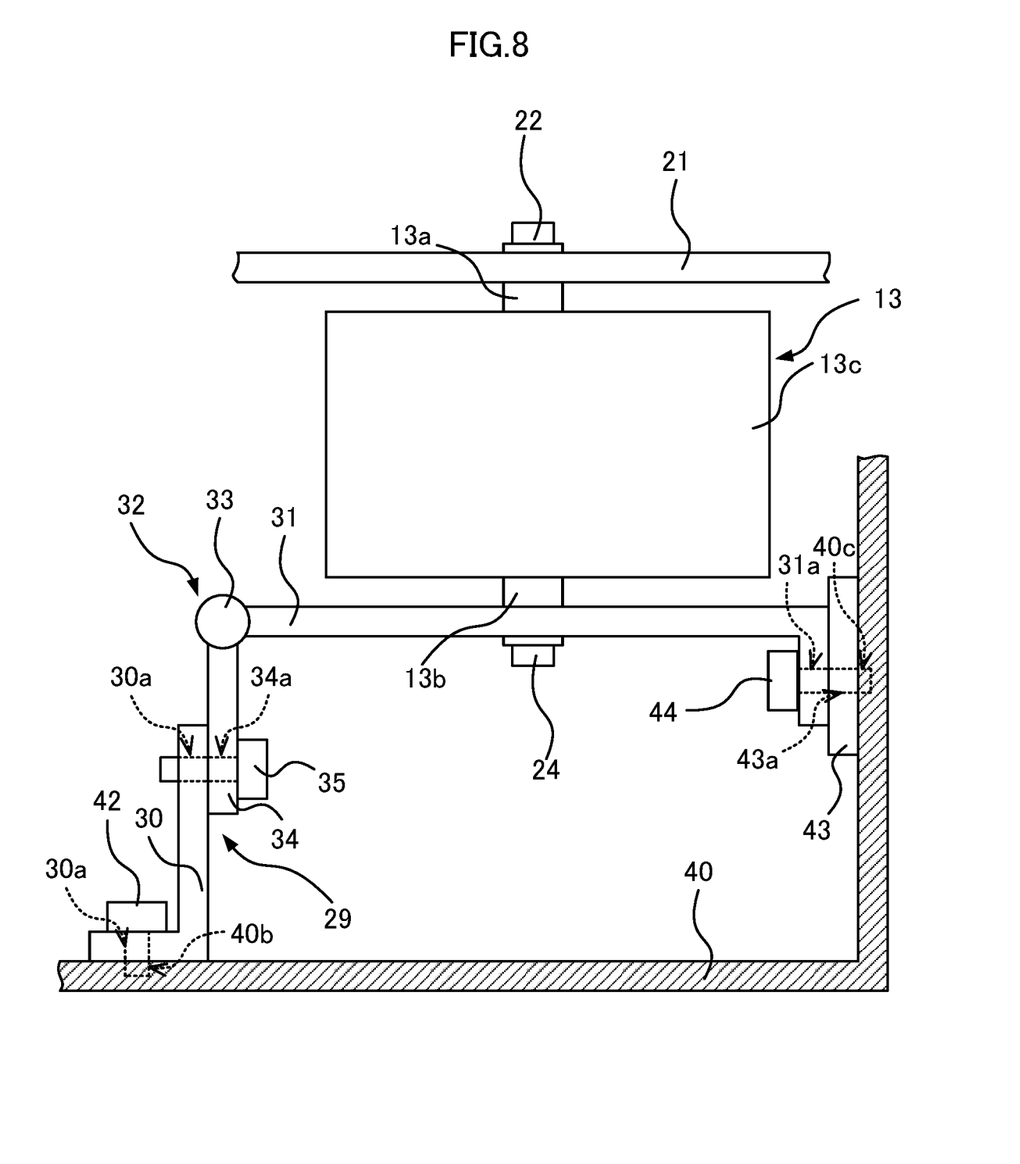
FIG. 8 is a front view of a capacitor and a frame earth according to Embodiment 3 of the present disclosure.

As illustrated in FIG. 8, the capacitor 13 included in the power supply device 1 according to Embodiment 3 is fixed to a support 29 instead of the support 25.

The support 29 includes an electrically conductive reference member 30 fixed to the housing 40 that receives a reference potential, an electrically conductive mount member 31 to which the second terminal 13b of the capacitor 13 in contact with the mount member 31 is fixed, and a switch mechanism 32 that electrically connects the mount member 31 to the reference member 30 or electrically disconnects the mount member 31 from the reference member 30 with a mechanical operation. In Embodiment 3, the housing 40 is grounded. The reference member 30, the mount member 31, and the switch mechanism 32 are formed of a conductor, for example, metal such as copper or aluminum.

The power supply device 1 also includes a fastener 35 that fixes the mount member 31 to the reference member 30. The power supply device 1 also includes a fastener 42 that fixes the reference member 30 to the housing 40, an insulating member 43 that comes into contact with the mount member 31 and the housing 40, and a fastener 44 that fixes the mount member 31 to the housing 40. The fastener 42 is formed of a conductor, for example, metal such as copper or aluminum. The fastener 42 formed of a conductor helps conduction of electricity between the reference member 30 and the housing 40. This structure increases the efficiency of electrical conduction between the reference member 30 and the housing 40. The fastener 44 is formed of an insulator, such as resin or ceramics.

The reference member 30 has a surface facing the mount member 31 and a surface facing the housing 40. The surface of the reference member 30 facing the housing 40 has a through-hole 30a.

The mount member 31 has a surface facing the second terminal 13b and a surface facing the housing 40. The surface of the mount member 31 facing the housing 40 has a through-hole 31a.

The switch mechanism 32 includes a shaft 33 fixed to the mount member 31, and a rotator 34 attached to the shaft 33 and rotatable about the shaft 33. The shaft 33 and the rotator 34 included in the switch mechanism 32 are formed of a conductor, for example, metal such as copper or aluminum.

The surface of the housing 40 facing the reference member 30 has an insertion hole 40b. The surface of the housing 40 facing the mount member 31 has an insertion hole 40c.

The insulating member 43 is held between the mount member 31 and the housing 40. The insulating member 43 is formed of an insulator such as resin or ceramics. Thus, the insulating member 43 electrically disconnects the mount member 31 from the housing 40. The insulating member 43 has a through-hole 43a. The through-hole 43a extends in the direction in which the mount member 31 and the housing 40 face each other.

The fastener 35 fixes the rotator 34 in contact with the reference member 30 to the reference member 30. When the rotator 34 is fixed to the reference member 30, the mount member 31 and the reference member 30 are electrically connected to each other. Thus, the second terminal 13b in contact with the mount member 31 and fixed to the mount member 31 is grounded.

The fastener 42 extends through the through-hole 30a to be received in the insertion hole 40b to fix the reference member 30 to the housing 40.

The fastener 44 extends through the through-holes 31a and 43a to be received in the insertion hole 40c to fix the mount member 31 to the housing 40 with the insulating member 43 held between the mount member 31 and the housing 40.

Figure 9:
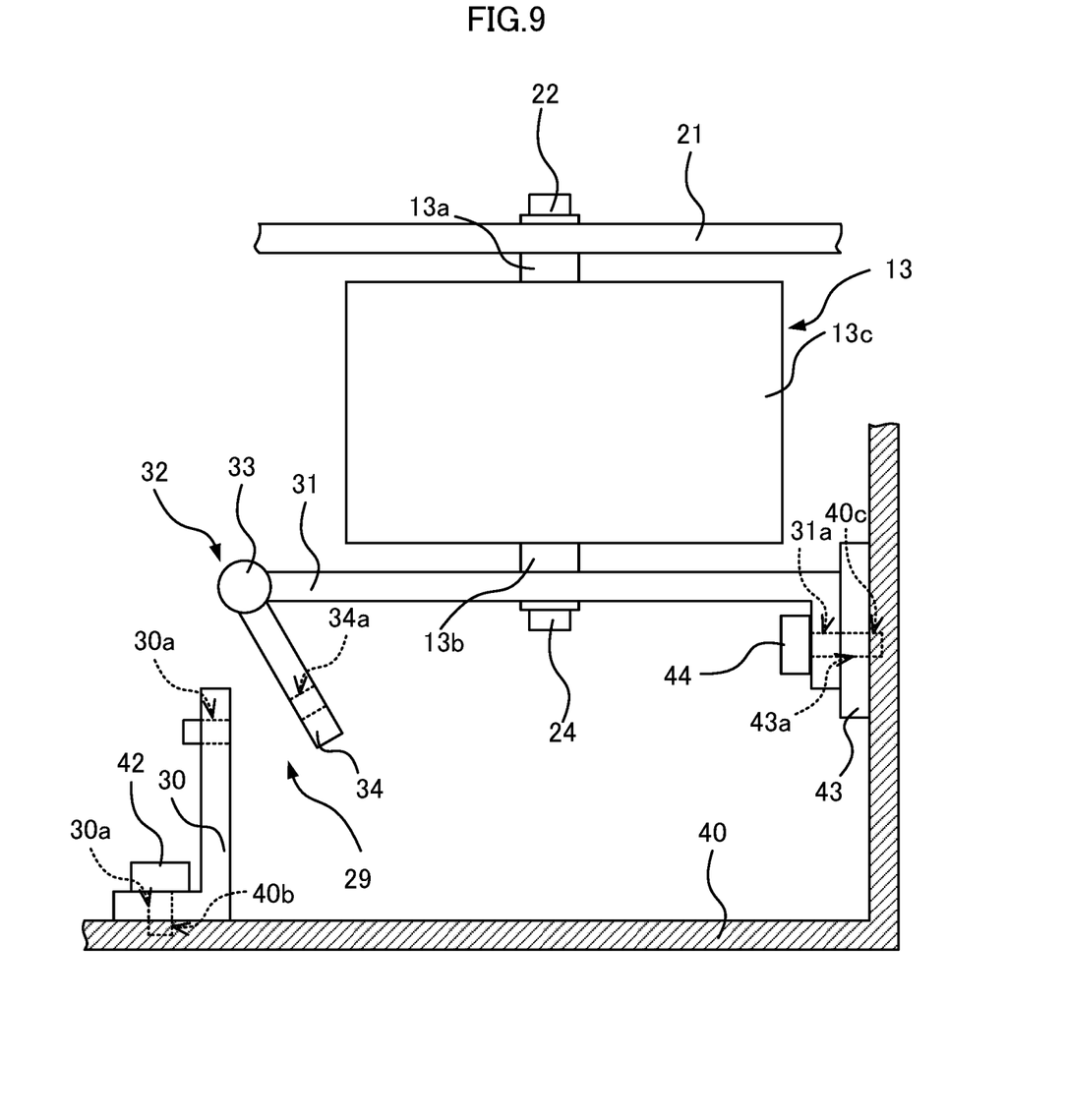
FIG. 9 is a front view of the capacitor and the frame earth according to Embodiment 3.

As illustrated in FIG. 9, when the rotator 34 rotates about the shaft 33 in a direction away from the reference member 30, the rotator 34 and the reference member 30 are separated from each other. Thus, the mount member 31 is electrically disconnected from the reference member 30. Consequently the second terminal 13b of the capacitor 13 is disconnected from the reference member 30 that receives a reference potential. Separating the rotator 34 and the reference member 30 from each other prevents the capacitor 13 from receiving a high voltage when a withstanding voltage test is conducted on the power converter 11.

As described above, in the power supply device 1 according to Embodiment 3, the switch mechanism 32 electrically connects the mount member 31 to the reference member 30 or electrically disconnects the mount member 31 from the reference member 30 with a mechanical operation of the rotator 34 rotating about the shaft 33.

Embodiments of the present disclosure are not limited to the above examples.

Figure 10:
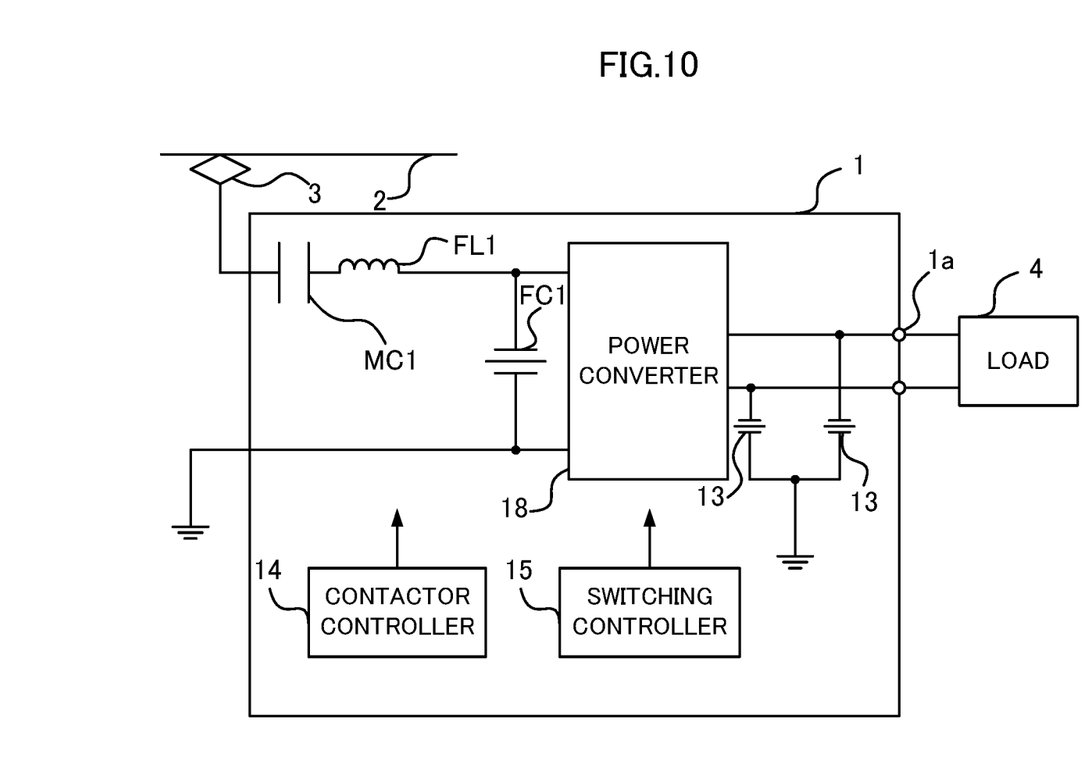
FIG. 10 is a block diagram of a power supply device according to a modification of any of the embodiments of the present disclosure.

For example, the power supply device 1 may have any circuit structure that performs power conversion. For example, the power supply device 1 may include a power converter including a DC-to-DC converter. The power supply device 1 illustrated in FIG. 10 includes a power converter 18 including a DC-to-DC converter, instead of the power converter 11. One end of each capacitor 13 is connected to the corresponding one of the secondary terminals of the power converter 18.

The mode of fixing the first terminal 13a to the busbar 21 and the mode of fixing the second terminal 13b to the support 23, 25, or 29 are not limited to the above examples.

For example, the first terminal 13a may include a flange at the end that comes into contact with the busbar 21. Similarly, the second terminal 13b may include a flange at the end that comes into contact with the support 23, 25, or 29.

In another example, the busbar 21 may include a protrusion to be fitted in the insertion hole in the first terminal 13a. In this case, the protrusion of the busbar 21 has a through-hole that allows the fastener 22 to extend through. This through-hole may preferably have a groove in which the screw-shaped fastener 22 is fitted. Similarly, the support 23, 25, or 29 may include a protrusion to be fitted in the insertion hole in the second terminal 13b. In this case, the protrusion of the support 23, 25, or 29 has a through-hole that allows the fastener 24 to extend through. This through-hole may preferably have a groove in which the screw-shaped fastener 24 is fitted.

The first terminal 13a may be arranged without being directly in contact with the busbar 21 as described above. For example, the first terminal 13a may be fixed to the busbar 21 with a first conductive member held between the first terminal 13a and the busbar 21. The first conductive member includes, for example, an elastic conductive ring. Similarly, the second terminal 13b may be fixed to the support 23, 25, or 29 with a second conductive member held between the second terminal 13b and the support 23, 25, or 29.

To increase the efficiency of electrical conduction between the busbar 21 and the first terminal 13a, the contact surfaces between the first terminal 13a and the busbar 21 may preferably be mirror-finished. Similarly, the contact surfaces between the second terminal 13b and the support 23, 25, or 29 may preferably be mirror-finished.

Alternatively, to increase the efficiency of electrical conduction between the busbar 21 and the first terminal 13a, the power supply device 1 may also include an electrically conductive compound applied to the contact surfaces between the first terminal 13a and the busbar 21. Similarly, the power supply device 1 may also include an electrically conductive compound applied to the contact surfaces between the second terminal 13b and the support 23, 25, or 29.

The power supply device 1 may also include an electrically conductive adhesive applied to the surroundings of the first terminal 13a fixed to the busbar 21.

The method for fixing the first terminal 13a to the busbar 21 is not limited to the above-described examples and includes, for example, soldering and welding. Similarly, the method for fixing the second terminal 13b to the support 23, 25, or 29 is not limited to the above-described examples and includes, for example, soldering and welding.

The shapes of the first and second terminals 13a and 13b are not limited to the above examples. For example, the first and second terminals 13a and 13b may be tapered or may have a smaller thickness toward the distal end.

For example, the first and second terminals 13a and 13b may have a plate shape. In this case, the distal end of the first terminal 13a may be bent and come into contact with the busbar 21. In addition, the fastener 22 may extend through the through-hole formed in the distal end of the first terminal 13a to fix the first terminal 13a to the busbar 21. Similarly, the distal end of the second terminal 13b may be bent and come into contact with the support 23, 25, or 29. In addition, the fastener 24 may extend through the through-hole formed in the distal end of the second terminal 13b to fix the second terminal 13b to the support 23, 25, or 29.

The fixing member 26 and the movable member 27 may have any shape and structure that allow the movable member 27 to move relative to the fixing member 26. For example, the movable member 27 may slide along a groove formed on the fixing member 26.

The switch mechanism 32 may have any shape that enables electrical connection between the mount member 31 and the reference member 30 and electrical disconnection of the mount member 31 from the reference member 30 with a mechanical operation. For example, the switch mechanism 32 may include a knife switch.

The power supply device 1 is also installable in an electric railway vehicle using an AC feeder. In this case, the power supply device 1 also includes a converter that converts AC power to DC power.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Power supply device
1a Output terminal
2 Overhead line
3 Current collector
4 Load
11, 18 Power converter
12 Transformer
13 Capacitor
13a First terminal
13b Second terminal
13c Case
14 Contactor controller
15 Switching controller
16 Capacitor element
16a, 16b Electrode
16c, 16d Separator
17a, 17b Lead tab
21 Busbar
22, 24, 28, 35, 41, 42, 44 Fastener
23, 25, 29 Support
26 Fixing member
26a, 26b, 27a, 30a, 31a, 43a Through-hole
27 Movable member
30 Reference member
31 Mount member
32 Switch mechanism
33 Shaft
34 Rotator
40 Housing
40a, 40b, 40c Insertion hole
43 Insulating member
FC1 Filter capacitor
FL1 Filter reactor
MC1 Contactor

The invention claimed is:

1. A power supply device for converting power supplied from a power source to power to be supplied to a load and supplying the converted power to the load from an output terminal, the power supply device comprising:
a power converter to convert the power supplied from the power source to the power to be supplied to the load and to output the converted power to the output terminal;
a capacitor including a dielectric, two electrodes opposing each other with the dielectric in between, a case accommodating the dielectric and the two electrodes, a first terminal electrically connected to one of the two electrodes and exposed outside the case, and a second terminal electrically connected to the other one of the two electrodes and exposed outside the case, the capacitor being located in a circuit between the power converter and the output terminal;
a busbar to which the first terminal is fixed, the busbar electrically connecting the first terminal to the output terminal; and
an electrically conductive support to which the second terminal is fixed, and wherein the electrically conductive support receives a reference potential.

2. The power supply device according to claim 1, wherein the case has a shape of a cylinder having two closed end surfaces,
the first terminal is exposed outside the case through one of the end surfaces, and
the second terminal is exposed outside the case through the other one of the end surfaces.

3. The power supply device according to claim 1, wherein the first terminal is adjacent to the output terminal.

4. The power supply device according to claim 2, wherein the first terminal is adjacent to the output terminal.

5. The power supply device according to claim 3, wherein the busbar has a length of less than or equal to 300 millimeters from the first terminal to the output terminal.

6. The power supply device according to claim 4, wherein the busbar has a length of less than or equal to 300 millimeters from the first terminal to the output terminal.

7. The power supply device according to claim 1, wherein the first terminal is fixed to the busbar with the first terminal being in contact with the busbar.

8. The power supply device according to claim 1, wherein the first terminal is fixed to the busbar with a first conductive member held between the first terminal and the busbar.

9. The power supply device according to claim 1, wherein the second terminal is fixed to the electrically conductive support with the second terminal being in contact with the electrically conductive support.

10. The power supply device according to claim 1, wherein the second terminal is fixed to the electrically conductive support with a second conductive member held between the second terminal and the electrically conductive support.

11. The power supply device according to claim 1, further comprising:
a housing accommodating the capacitor,
wherein
the electrically conductive support includes
an electrically conductive fixing member fixed to the housing and configured to receive the reference potential, and
an electrically conductive movable member movable relative to the fixing member and in contact with the fixing member, and
the second terminal is fixed to the movable member with the second terminal being in contact with the movable member.

12. The power supply device according to claim 2, further comprising:
a housing accommodating the capacitor,
wherein
the electrically conductive support includes
an electrically conductive fixing member fixed to the housing and configured to receive the reference potential, and
an electrically conductive movable member movable relative to the fixing member and in contact with the fixing member, and
the second terminal is fixed to the movable member with the second terminal being in contact with the movable member.

13. The power supply device according to claim 3, further comprising:
a housing accommodating the capacitor,
wherein
the electrically conductive support includes
an electrically conductive fixing member fixed to the housing and configured to receive the reference potential, and an electrically conductive movable member movable relative to the fixing member and in contact with the fixing member, and the second terminal is fixed to the movable member with the second terminal being in contact with the movable member.

14. The power supply device according to claim 7, further comprising:

a housing accommodating the capacitor, wherein the electrically conductive support includes an electrically conductive fixing member fixed to the housing and configured to receive the reference potential, and an electrically conductive movable member movable relative to the fixing member and in contact with the fixing member, and the second terminal is fixed to the movable member with the second terminal being in contact with the movable member.

15. The power supply device according to claim 2, wherein the electrically conductive support includes an electrically conductive reference member to receive the reference potential, an electrically conductive mount member in contact with the second terminal, and a switch mechanism to electrically connect the mount member to the reference member or electrically disconnect the mount member from the reference member with a mechanical operation.

16. The power supply device according to claim 3, wherein the electrically conductive support includes an electrically conductive reference member to receive the reference potential, an electrically conductive mount member in contact with the second terminal, and a switch mechanism to electrically connect the mount member to the reference member or electrically disconnect the mount member from the reference member with a mechanical operation.

17. The power supply device according to claim 7, wherein the electrically conductive support includes an electrically conductive reference member to receive the reference potential, an electrically conductive mount member in contact with the second terminal, and a switch mechanism to electrically connect the mount member to the reference member or electrically disconnect the mount member from the reference member with a mechanical operation.

18. The power supply device according to claim 1, wherein the capacitor is a plurality of the capacitors, the busbar is a plurality of the busbars, and the first terminal of each of the plurality of capacitors is fixed to a corresponding busbar of the plurality of busbars, and each of the plurality of busbars electrically connects the first terminal to a corresponding output terminal of a plurality of the output terminals.

19. A power supply device for converting power supplied from a power source to power to be supplied to a load and supplying the converted power to the load from an output terminal, the power supply device comprising:

a power converter to convert the power supplied from the power source to the power to be supplied to the load and to output the converted power to the output terminal;

a capacitor including a dielectric, two electrodes opposing each other with the dielectric in between, a case accommodating the dielectric and the two electrodes, a first terminal electrically connected to one of the two electrodes and exposed outside the case, and a second terminal electrically connected to the other one of the two electrodes and exposed outside the case, the capacitor being located in a circuit between the power converter and the output terminal;

a busbar to which the first terminal is fixed, the busbar electrically connecting the first terminal to the output terminal;

an electrically conductive support to which the second terminal is fixed, the electrically conductive support being configured to receive a reference potential; and wherein the electrically conductive support includes an electrically conductive reference member to receive the reference potential, an electrically conductive mount member in contact with the second terminal, and a switch mechanism to electrically connect the mount member to the reference member or electrically disconnect the mount member from the reference member with a mechanical operation.

20. A capacitor for a power supply device for converting power supplied from a power source to power to be supplied to a load and supplying the converted power to the load from an output terminal, the capacitor comprising:

a dielectric;

two electrodes opposing each other with the dielectric in between;

a case accommodating the dielectric and the two electrodes;

a first terminal electrically connected to one of the two electrodes and exposed outside the case; and a second terminal electrically connected to the other one of the two electrodes and exposed outside the case, wherein the first terminal is fixed to a busbar connected to the output terminal, and the busbar electrically connects the first terminal to the output terminal, and the second terminal is fixed to an electrically conductive support that receives a reference potential.

* * * * *